(12) United States Patent
Kalliske et al.

(10) Patent No.: US 7,631,895 B2
(45) Date of Patent: Dec. 15, 2009

(54) AIRBAG MODULE

(75) Inventors: Ingo Kalliske, Potsdam (DE); Friederike Keudel, Lörrach-Brombach (DE); Makoto Ogawa, Shiga (JP)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/035,051

(22) Filed: Feb. 21, 2008

(65) Prior Publication Data

US 2008/0203710 A1   Aug. 28, 2008

Related U.S. Application Data

(63) Continuation of application No. PCT/DE2006/001445, filed on Aug. 15, 2006.

(30) Foreign Application Priority Data

Aug. 25, 2005  (DE) ................ 20 2005 013 064
Mar. 8, 2006   (DE) ................ 10 2006 011 058

(51) Int. Cl.
    *B60R 21/16* (2006.01)
(52) U.S. Cl. .................................. 280/743.2
(58) Field of Classification Search ............ 280/743.1, 280/743.2
    See application file for complete search history.

(56) References Cited

U.S. PATENT DOCUMENTS 3,879,057 A * 4/1975 Kawashima et al. ..... 280/743.2
5,125,682 A * 6/1992 Hensler et al. ........... 280/730.1
6,726,245 B2 * 4/2004 Fellhauer et al. ......... 280/743.2
6,834,886 B2   12/2004 Hasebe et al.
6,913,283 B2   7/2005 Heym
7,360,790 B2 * 4/2008 Hasebe et al. ............ 280/743.2
2004/0155439 A1  8/2004 Hasebe et al.
2004/0155440 A1  8/2004 Hasebe et al.
2004/0164526 A1  8/2004 Hasebe et al.
2004/0195807 A1  10/2004 Hasebe et al.

FOREIGN PATENT DOCUMENTS

| DE | 201 02 115 U1 | 8/2001 |
| EP | 1 364 838 A2 | 11/2003 |
| EP | 1 364 840 A1 | 11/2003 |
| EP | 1 231 116 B1 | 9/2004 |
| EP | 1 452 403 A1 | 9/2004 |
| EP | 1 580 083 A2 | 9/2005 |
| WO | WO 02/02376 A1 | 1/2002 |

* cited by examiner

*Primary Examiner*—Faye M. Fleming
(74) *Attorney, Agent, or Firm*—Foley & Lardner LLP

(57) ABSTRACT

An airbag module includes an airbag with two sections that can be inflated to restrain a vehicle occupant. The inflated airbag defines a gap separating the two sections from each other on a front side of the airbag facing the vehicle occupant. A maximum distance between the airbag sections is dependent on a degree the airbag is filled with the distance decreasing as the airbag is filled. The airbag module also includes a strap at least partially fastened to an outer skin of the airbag. The strap includes at least a first and a second section of variable length. The length of the first section increases or decreases to the extent the length of the second section decreases or increases. The length of the second section defines the maximum distance between the airbag sections.

20 Claims, 4 Drawing Sheets

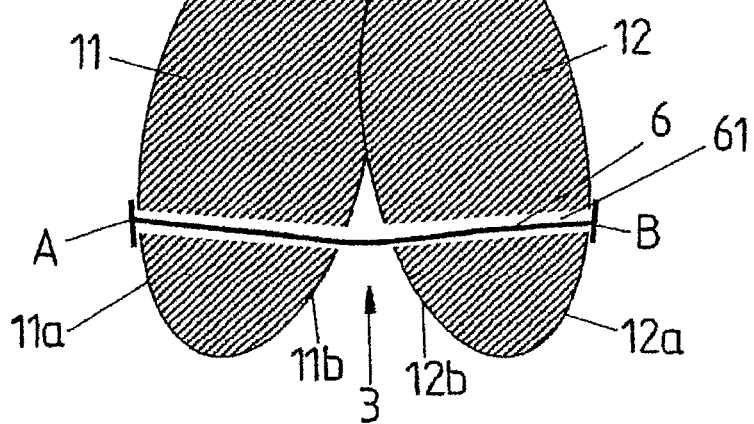
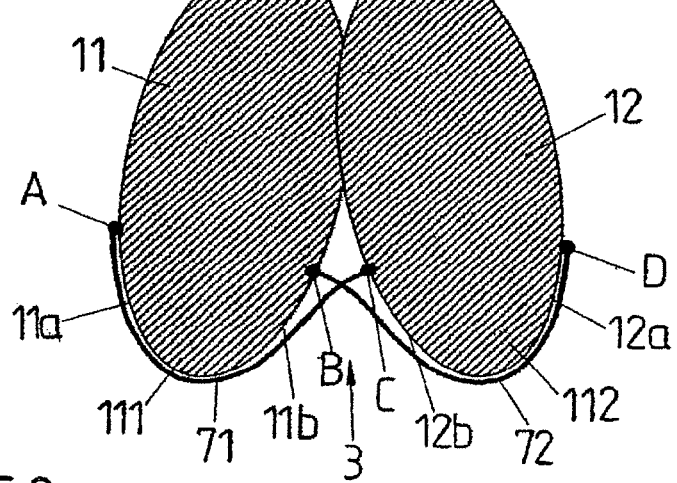
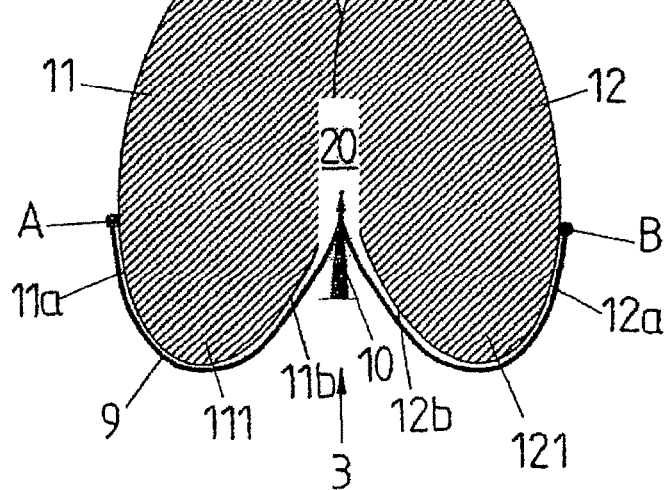

AIRBAG MODULE

CROSS-REFERENCE TO RELATED PATENT APPLICATIONS

This application is a Continuation of International Application PCT/DE2006/001445, filed Aug. 15, 2006, which is incorporated herein by reference in its entirety. This International Application was not published in English but was published in German as WO 2007/022758.

BACKGROUND

The present application relates generally to the field of airbag modules.

It is known that, under certain circumstances, the deployment of an airbag of an airbag module may be associated with risks for the vehicle occupant being restrained in the event of an impact. There are risks in particular for individuals who are outside a normal sitting position on the driver or passenger seat (an "out of position (OOP) situation"), for very small individuals sitting on the driver seat close to the steering wheel, and for babies in rearwardly directed child seats on the passenger seat (a "rear facing infant seat (RFIS) situation"). There are various strategies used to minimize the risk of injuries to such individuals or individuals in such situations. One strategy involves what is referred to as a low risk deployment of an airbag (LRD). Low risk deployment is intended to minimize the risk of injuries by measures that are already effective during the deployment of the airbag.

SUMMARY

One embodiment of the application relates to an airbag module. The airbag module includes an airbag with two sections that can be inflated to restrain a vehicle occupant. The inflated airbag defines a gap that runs through the two airbag sections separating the two sections from each other on a front side of the airbag facing the vehicle occupant. A maximum distance between inner sides of the airbag sections that are adjacent to the gap is dependent on a degree the airbag is filled with the distance decreasing as the airbag is filled. The airbag module also includes a strap at least partially fastened to an outer skin of the airbag. The strap includes at least a first and a second section of variable length. The length of the first section increases or decreases to the extent the length of the second section decreases or increases. The length of the second section defines the maximum distance between the inner sides of the airbag sections.

Another embodiment of the application relates to an airbag module. The airbag module includes an airbag with two sections that can be inflated to restrain a vehicle occupant. The inflated airbag defines a gap that runs through the two airbag sections separating the two airbag sections from each other on a front side of the airbag facing the vehicle occupant. A maximum distance between inner sides of the airbag sections that are adjacent to the gap is dependent on a degree the airbag is filled with the distance decreasing as the airbag is filled. The airbag module also includes at least one strap connects the two airbag sections to each other. Each airbag section includes an inner strap that interacts with an outer strap that connects the two airbag sections.

Another embodiment of the application relates to an airbag module. The airbag module includes an airbag with two sections that can be inflated to restrain a vehicle occupant. The inflated airbag defines a gap that runs between the two airbag sections and separates the two airbag sections from each other on a front side of the airbag facing the vehicle occupant. A maximum distance between inner sides of the airbag sections that are adjacent to the gap is dependent on a degree the airbag is filled with the distance decreasing as the airbag is filled. The airbag module also includes two straps. One end of one strap is fixed on an outer side of one airbag section facing away from the gap and the other end of the one strap is fixed on an inner side of the other airbag section facing the gap. One end of the other strap is fixed on an outer side of the other airbag section facing away from the gap and the other end of the other strap is fixed on an inner side of the one airbag section facing the gap. The two straps run between fastening points on the outer side of the airbag sections and each strap runs along a front region of the airbag sections that faces a vehicle occupant.

Another embodiment of the application relates to an airbag module. The airbag module includes an airbag with two sections that can be inflated to restrain a vehicle occupant. The inflated airbag defines a gap that runs between the two airbag sections separating the two airbag sections from each other on a front side of the airbag facing the vehicle occupant. A maximum distance between inner sides of the airbag sections that are adjacent to the gap is dependent on a degree the airbag is filled with the distance decreasing as the airbag fills. The airbag module also includes a movable part arranged in a region of the gap between the airbag sections. The movable part is displaced during a filling of the airbag and interacts with zip fasteners on the inner sides of the two airbag sections to connect the inner sides to each other.

BRIEF DESCRIPTION OF THE DRAWINGS

The application is explained in more detail below using a number of exemplary embodiments and with reference to the figures of the drawing, in which:

FIG. 6 shows an airbag including two airbag sections in which the outer surfaces of the two airbag sections face away from each other and are connected to each other via a strap of fixed length running through the airbag sections according to an exemplary embodiment;

FIG. 7 shows an airbag including two straps each connected to the outer side of one of the two airbag sections and to the inner side of the other of the two airbag sections according to an exemplary embodiment;

FIG. 8 shows an airbag including two mutually facing inner sides of the two airbag sections connected to each other with a zip fastener according to an exemplary embodiment;

DETAILED DESCRIPTION

Figure 1:
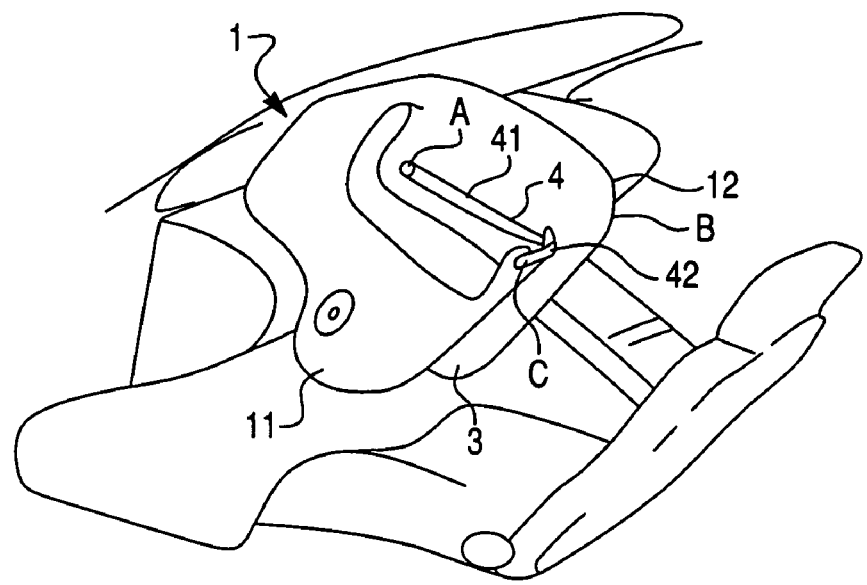
FIG. 1 is a perspective partial cutaway view of an airbag with two airbag sections connected to each other via a strap connected to the airbag surface at three points according to a first exemplary embodiment.

According to an exemplary embodiment, an airbag module may include an airbag that has two airbag sections as described in EP 1 364 840 A1, which is herein incorporated by reference in its entirety. The two airbag sections are connected to each other on the rear side of the airbag, which side faces away from a vehicle occupant to be restrained, with a single gas generator ensuring the inflation of the two airbag sections in the event of triggering. Furthermore, the airbag module provides a sheet-like element that bridges the front side of the airbag and intercepts the vehicle occupant in the event of an impact in the direction of the front side of the airbag, not by means of the two airbag sections, but rather by the sheet-like element. The vehicle occupant may be prevented from penetrating completely into the gap formed between the two airbag sections since this may result in the vehicle occupant being subjected to a thermal loading, in particular if he comes into contact with hot fabric parts of the airbag. According to another exemplary embodiment, the inflated airbag forms a gap on a front side of the airbag (facing the vehicle occupant) that runs between the two airbag sections. The gap separates the two airbag sections from each other on the front side of the airbag.

According to another exemplary embodiment, the airbag comprises two airbag sections that a gap is formed between when in an inflated state as described in WO 02/02376, which is herein incorporated by reference in its entirety. During the inflation of the airbag an occupant in an OOP situation may penetrate the forming gap and expand the gap with a body part facing the airbag. This may prevent a direct collision of the vehicle occupant with the airbag casing surface that faces him.

There is a need for occupant restraint systems that permit a low risk deployment of the airbag and reduce the risks for OOP situations and RFIS situations. In particular, there is a need to further optimize known airbag modules with two airbag sections that have a gap between them on a side facing the vehicle occupant.

The present application is based on an object of providing an airbag module (e.g., a driver module, a passenger module, etc.) with an airbag having two sections to effectively reduce the risk of injuries of individuals in OOP and RFIS situations with a low risk deployment of the airbag.

The airbag module according to the application may cause the maximum distance between the inner sides of the two airbag sections, which are adjacent to the gap between the two airbag sections, to be dependent on the degree the airbag is filled. The distance may decrease as the airbag is filled. The maximum distance between the inner sides of the airbag sections may be large or wide in an initial filling phase of the airbag so that a person in an OOP situation can penetrate the gap that runs between the two airbag sections and therefore direct impact with the deploying airbag covering may be substantially prevented and the force acting on the vehicle occupant may be reduced. In the case of a rearwardly directed child seat arranged on the passenger seat, the two airbag sections can position themselves laterally around the child seat in the initial filling phase with the force applied to the backrest (in the direction of travel) of the child seat reduced.

As the airbag fills, the distance between the two airbag sections or their mutually opposite inner sides decreases. Therefore a vehicle occupant who is to be restrained interacts with the largely or completely filled airbag strikes against a front side of the airbag in which the gap between the two airbag sections is very small or has virtually disappeared. An essentially closed outer surface of the airbag interacts with and restrains the vehicle occupant in the same manner as in the case of conventional airbags provided with just one chamber.

In the direction of travel, the distance between the inner sides of the two airbag sections (on a transverse axis with respect to the direction of travel) is the distance between the left inner side of an airbag section arranged on the right and the right inner side of an airbag section arranged on the left.

The gap between the two airbag sections is the space that extends between the two mutually facing fabric sections (the inner sides) of the two airbag sections. In the initial phase of the filling of the airbag, the gap can have a considerable extent, however, for purposes of this application the space in the initial phase is still referred to as a gap even when it has a relatively large width.

In a preferred refinement of the application, the airbag module includes a strap that is at least partially fastened to the outer skin of the airbag and has at least a first and a second section of variable length. The length of the first section increases or decreases to the extent that the length of the second section decreases or increases and the length of the second section defines the maximum distance between the inner sides of the airbag sections. The length of the first section increases as the airbag is filled and the length of the second section decreases as the airbag is filled.

The strap is preferably connected to at least a first point of the first airbag section, to at least a second point of the other airbag section, and to at least a third point of the airbag or to another element of the airbag module.

In particular, it is preferable that the strap is fixed at one end to a first fastening point of the airbag or to another element of the airbag module. The strap is fixed at the distal end to a second fastening point of the first airbag section. Between the fastening points the strap deflects at a deflection point formed on the second airbag section. The first section may is defined between the first fastening point and the deflection point and the second section is defined between the deflection point and the second fastening point. The deflection point and the second fastening point may be located on different airbag sections. The length of the strap section between the two points defines the maximum distance between the inner sides of the two airbag sections.

The deflection point is formed on the airbag, for example by a loop or eyelet through which the strap extends. The strap can be displaced in relation to the deflection point.

Preferably, the first fastening point position is essentially unchanged after the airbag is inflated. Alternatively, the first fastening point position is not touched by inflation of the airbag. In both cases, when the airbag is completely inflated the position of the two airbag sections with respect to each other is no longer changed. The first fastening point is defined, for example, on the module housing of the airbag module. However, the first fastening point may also be defined on the airbag, in particular on a part of the airbag in which the two airbag chambers converge and that is located in the vicinity of the gas generator.

The deflection point and the second fastening point may each be defined in a front region of the airbag sections that faces the vehicle occupant to be restrained. This location has the advantage that the regions of the airbag sections that face the vehicle occupant are brought towards each other via the strap running between the points during inflation and therefore the vehicle occupant interacts with a relatively homogeneous surface of the airbag in the event of a crash.

In an alternative embodiment, the strap may define a closed loop and be connected to the airbag or to other elements of the airbag module either via two deflection points and a fastening point or via three deflection points. There may be a deflection point on each of the two airbag sections.

The airbag module may include at least one strap that connects the two airbag sections to each other. In particular, it is advantageous that the at least one strap defines the maximum distance between the outer side of one airbag section facing away from the gap and the outer side of the other airbag section facing away from the gap. The inner sides of the airbag sections are adjacent to the gap and move toward each other the airbag is filled.

One exemplary embodiment includes a strap, one end of which is fixed on the outer side of one airbag section and faces away from the gap, and the other end of which is fixed on the outer side of the other airbag section and faces away from the gap. The strap extends through the airbag sections. The strap preferably extends in a tunnel-like guide through the airbag sections without coming into contact with the interior of the airbag. As the airbag is filled, the inner sides of the airbag sections move towards each other while the distance between the outer sides of the airbag sections is predetermined by the strap.

According to another exemplary embodiment, each airbag section has an inner strap that interacts with an outer strap that connects the two airbag sections. The inner strap is preferably guided in the interior of the airbag by a fastening point on an inner side of the airbag section facing the gap to an outer side of the airbag section facing away from the gap. The inner strap is deflected at an inner deflection device and is then connected to one end of the outer strap. The outer strap is guided within the airbag chambers in a fabric tube that is not connected to the interior of the airbag chambers and therefore gas cannot escape via the fabric tube. In each airbag chamber, one end of the inner strap, one end of the fabric tube, and one end of the outer strap are preferably connected to one another in a sewn together connecting region.

According to another exemplary embodiment, the two inner straps and the outer strap are integrally formed as a single strap. The fabric tube of each airbag chamber is preferably connected to the strap in a gas-tight manner at an end located in the interior of the airbag chamber.

According to another exemplary embodiment, the airbag module includes two straps. One end of one strap is fixed at a fastening point to the outer side of one airbag section facing away from the gap and the other end of the strap is fixed at a fastening point on the inner side of the other airbag section facing the gap. One end of the other strap is fixed at a fastening point to the outer side of the other airbag section facing away from the gap and the other end of the other strap is fixed at a fastening point to the inner side of the first airbag section facing the gap. The two straps run between the respective fastening points on the outer side of the respective airbag section and each run along the front region of the airbag sections (facing the vehicle occupant) and therefore during filling of the airbag the two straps are deflected and pull the inner sides of the airbag sections against each other.

According to another exemplary embodiment, the airbag module includes a movable part arranged in the region of the gap between the airbag sections. The movable part is displaced during filling of the airbag and connects the inner sides of the two airbag sections to each other via interaction with zip-fasteners on the inner sides. A type of zip fastener between the two airbag sections is pulled shut when the airbag is inflated.

The airbag module preferably includes a strap with one end fixed to the outer side of one airbag chamber and facing away from the gap and the other end fixed to the outer side of the other airbag chamber facing away from the gap. The strap runs along the outer side of the airbag and is connected to the movable part and displaces the movable part in the direction of the front side of the airbag during filling of the airbag. During filling of the airbag the strap is deflected and displaces the movable part.

The two airbag sections are preferably defined by two airbag chambers that preferably converge at a rear side facing away from the vehicle occupant.

Figure 2:
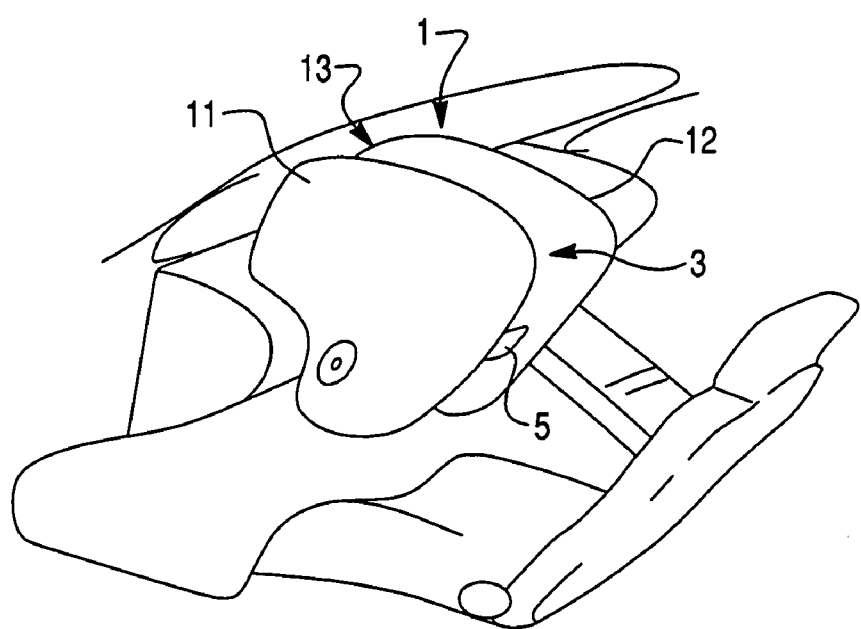
FIG. 2 is a perspective view of an airbag with two airbag sections according to an exemplary embodiment.

FIG. 2 shows a passenger airbag according to an exemplary embodiment as described in EP 1 364 840 A1, which is herein incorporated by reference in its entirety. An airbag 1 has two airbag sections 11, 12 also referred to as airbag chambers. The two airbag chambers 11, 12 are connected to each other on a side that faces away from the vehicle occupant to be restrained (e.g., faces the windshield) where they form a central region 13 into which the gas from a gas generator (not illustrated) flows in the event of triggering (e.g., due to a vehicle collision or impending vehicle collision). Starting from the central or common region 13, the airbag 1 defines the two airbag chambers 11, 12 (if the airbag outer casing is in the direction of the vehicle occupant) that are substantially separated or completely separated from each other on the front side of the airbag 1 facing the vehicle occupant and forming between them a gap 3. The two airbag chambers 11, 12 are connected to each other via a sheet-like element 5 of defined length to keep the two airbag chambers 11, 12 together in the inflated state so there is an impact surface for a vehicle occupant to be restrained. A similarly shaped airbag can be arranged on the driver side in a corresponding manner.

FIG. 1 shows an airbag with two chambers 11, 12 connected to each other via a strap 4. The strap 4 has two fastening points A, C and a deflection point B connecting it to the airbag 1 or to the airbag chambers 11, 12. The first fastening point A is located at that end of the gap 3, which faces away from the vehicle occupant. The fastening point A is not moved or is only slightly moved during deployment of the airbag and is in a stable position after deployment is finished. The fastening point A may be located, for example, in the vicinity of or on the central region 13. Fastening point A may instead be completely decoupled from the deployment of the airbag and be fastened, for example, to the housing (not illustrated) of the airbag module.

The deflection point B is located on the airbag chamber 12 in the vicinity of the front side facing the vehicle occupant. The deflection point B is defined on the inner side of the airbag chamber 12. The second fastening point C is located on the other airbag chamber 11 in a position corresponding to the position of the deflection point B.

The strap 4 forms two sections 41, 42; one section extends between the fastening point A and the deflection point B and the other section which extends between the deflection point B and the fastening point C. The two sections are also illustrated schematically in FIG. 3 during initial filling of the airbag.

The maximum distance between the airbag chambers 11, 12 or the inner sides 11b, 12b is defined by the length of the strap section 42 between the deflection point B and the second fastening point C. The entire length of the strap 4 may be constant, however, the length of the two sections 41, 42 changes over the course of deployment as illustrated in FIGS. 3 and 4.

Figure 3:
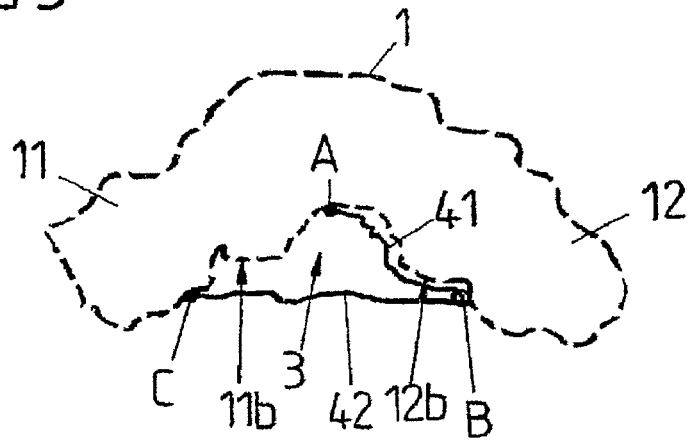
FIG. 3 shows the airbag of FIG. 1 in an initial deployment phase according to an exemplary embodiment.

FIG. 3 shows the airbag 1 in an initial phase of deployment. Since the two airbag chambers 11, 12 are not yet completely filled with gas, their extent in the direction of the vehicle occupant is small. Accordingly, the gap 3 between the two airbag chambers 11, 12 is not very deep and the length of the strap section 41 between the points A, B is relatively small. The length of the strap section 42 between the points B, C is furthermore relatively large making it possible to press or expand the two airbag chambers 11, 12 far apart radially. If during this state of the deployment a body part of a vehicle occupant in an OOP situation comes into contact with the airbag 1, the body part can penetrate the gap 3 that is forming. The force that the deploying airbag 1 exerts on the vehicle occupant may be greatly reduced. In the case of a child seat arranged directed rearwards, the two airbag chambers 11, 12 can deploy to the sides of the child seat without exerting too strong a force on the seat shell of the child seat.

Figure 4:
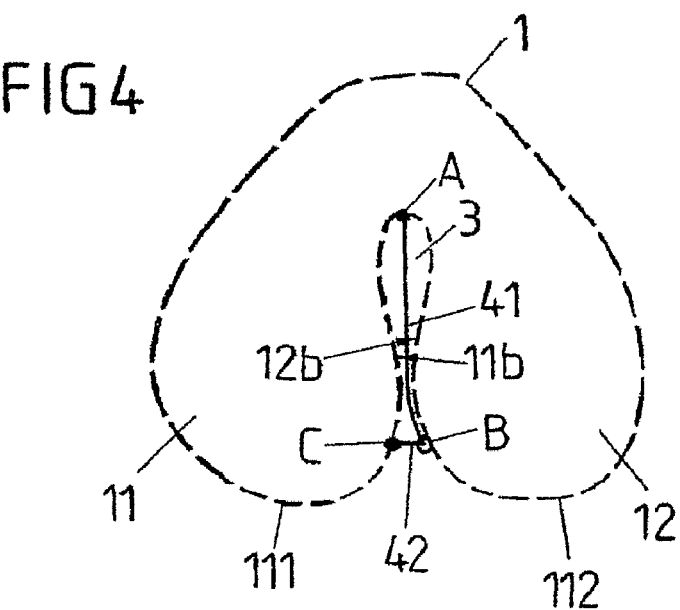
FIG. 4 shows the airbag of FIG. 3 after complete filling of the airbag according to an exemplary embodiment.

Over the course of filling the airbag 1, the airbag chambers 11, 12 are increasingly filled with gas causing the length of the strap section 41 between the points A, B to increase and the length of the strap section 42 between the points B, C to decrease, reducing the lateral distance between the inner sides 11b, 12b of the two airbag sections 11, 12 (see FIG. 4 also). If a vehicle occupant interacts with the airbag during filling, he is provided with an essentially planar impact surface defined by two end regions 111, 112 that face him with only a narrow gap 3 being formed between the airbag chambers 11, 12.

The strap section 42 controls the distance between the two airbag chambers 11, 12 and is therefore relatively long in a first section of deployment of the airbag 1 and the inner sides 11b, 12b of the two airbag chambers 11, 12 (and the airbag chambers themselves) are at a large distance from each other. In the event of interaction with a vehicle occupant the inner sides 11b, 12b can be pressed and spread radially outward to the maximum distance apart. With increased filling of the airbag 1 and the two airbag chambers 11, 12, the length of the strap section 42 between the points B, C automatically decreases with the two airbag chambers 11, 12 reducing their distance apart and essentially bearing against each other. After complete filling of the two airbag chambers 11, 12, they are in a position with respect to each other as in the case of the use of a sheetlike element 5 as described with reference to FIG. 2.

The strap 4 may be, for example, a fabric strip of a material with little elasticity. The strap 4 may preferably be of a sheetlike design or alternatively designed as a chord.

FIGS. 5 to 8 show further configurations of an airbag 1 with two airbag chambers 11, 12 where the maximum distance between the inner sides is controlled by at least one strap as a function of the state of deployment.

Figure 5:
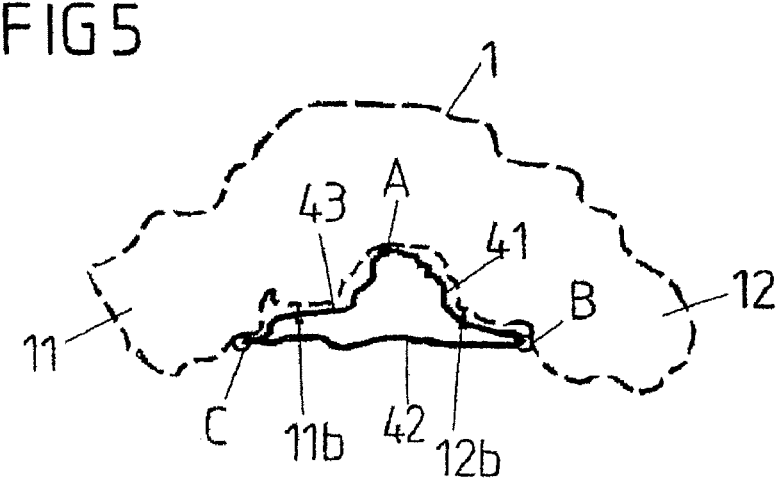
FIG. 5 shows an airbag in an initial filling phase corresponding to FIG. 3 with a strap controlling the lateral distance between the two airbag sections defined as a closed strap connected to the airbag at three positions according to an exemplary embodiment.

The configuration of FIG. 5 differs only slightly from the configuration of FIGS. 1, 3 and 4. The strap 4 defines a closed loop and a strap section 43 additionally runs between the points C and A. The points B and C are deflection points while point A is a fastening point. Alternatively, all three points A, B, C may be deflection points.

The sum of the lengths of the strap sections is generally constant. As the two airbag chambers 11, 12 are filled the length of the strap sections 41, 43 is increased and the length of the strap section 42 is reduced. In turn, the maximum distance between the inner sides 11b, 12b of the two airbag chambers 11, 12 automatically decreases during deployment. Since, a strap is provided both for the enlarging section 41 and for the enlarging section 43, a reduction of the distance between the inner sides 11a, 11b of the two airbag chambers 11, 12 takes place at increased speed.

FIG. 6 schematically illustrates an exemplary embodiment in which the two airbag chambers 11, 12 are connected to each other via a strap 6. Each airbag chamber 11, 12 has an outer surface 11a, 12a that faces away from the other airbag chamber and an inner surface 11b, 12b that faces towards the other airbag chamber and is adjacent to the gap 3. The strap 5 extends directly from a fastening point A on one outer side 11a to a fastening point B on the other outer side 12a. The strap 6 runs through a type of tunnel 61 in the airbag and is not connected to the interior of the airbag.

If the two airbag chambers 11, 12 are only filled with a small amount of gas, their inner surfaces 11b, 12b can be pressed outward radially to a great extent at a large maximum distance. The position of the outer surfaces 11a, 12a is predetermined by the length of the strap 6. As the airbag fills, the two inner surfaces 11b, 12b migrate toward each other and the distance between the inner surface is reduced.

In the configuration of FIG. 7, the airbag includes two straps 71, 72. One strap 71 has a first fastening point A on the outer side 11a of one airbag chamber 11 and a fastening point C on the inner side 12b of the other airbag chamber 12. The other strap 72 has a fastening point B on the inner side 11b of the airbag chamber 11 and a fastening point D on the outer side 12a of the other airbag chamber 12. When airbag chambers 11, 12 are only filled a small amount, the inner surfaces 11b, 12b can be pressed apart a good distance radially. As the airbag chambers 11, 12 and the end regions 111, 112 are filled the straps 71, 72 around the regions 111, 112 are directed downward and deflected. As a result, the inner surfaces 11b, 12b are brought closer to each other and the width of the gap 3 is reduced.

FIG. 8 shows a configuration in which a strap 9 is directed from a fastening point A on one outer side 11A of the airbag chamber 11 via a displaceable or moveable part 10 to a fastening point B on the outer side 12a of the airbag chamber 12.

The displaceable part 10 is part of a type of zip fastener device 20 that extends between the inner sides 11b, 12b of the two airbag chambers 11, 12 and is illustrated schematically in FIG. 8. The zip fastener device 20 may include two straps sewn to the inner sides 11b, 12b of the airbag chambers 11, 12 and about which a ring (not illustrated) is arranged. The ring may be the displaceable part 10.

During deployment of the two airbag chambers 11, 12, the displaceable part 10 is displaced downward due to the enlarging end regions 111, 121 and the associated deflection of the strap 7. As a result, the "zip fastener" is tightened and the two airbag chambers 11, 12 are brought closer to each other.

A "zip fastener device" is not necessarily defined as a device with elements that engage one another in a form-fitting manner.

Figure 9:
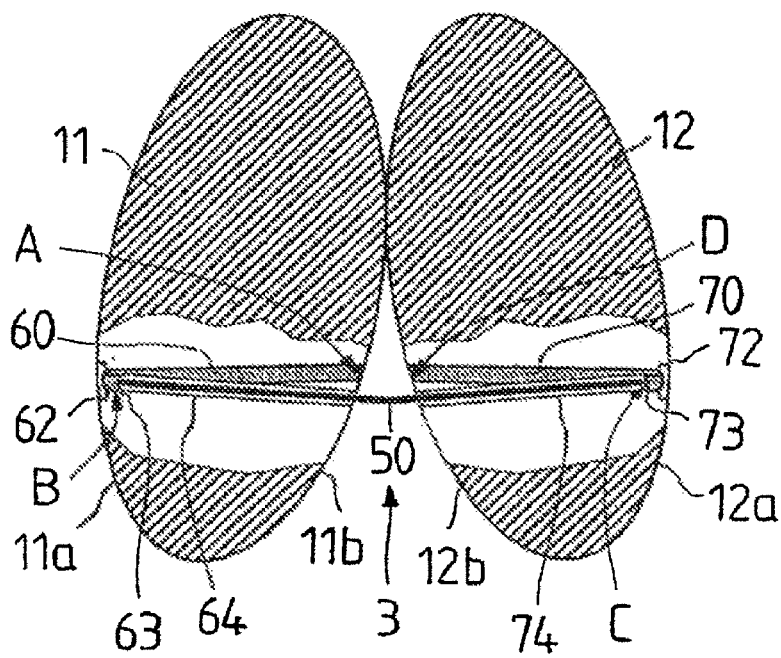
FIG. 9 shows an airbag including two airbag sections connected to each other by inner straps that run in the airbag sections in combination with an outer strap according to an exemplary embodiment.

In the exemplary embodiment of FIG. 9, a combination of inner and outer straps 50, 60, 70 is provided for connecting the two airbag chambers 11, 12. The airbag chamber 11 includes an inner strap 60 (e.g., a strap running in the interior of the airbag chamber), a deflection loop or an encircling ring 62, and an inner fabric tube 64. The other airbag chamber 12 likewise includes an inner strap 70, a deflection loop or a deflection ring 72, and an inner fabric tube 74. The outer strap 50 extends in the two fabric tubes 64, 74 and beyond the gap 3. This is explained in more detail with reference to the enlarged illustration of FIG. 10 of the airbag chamber 11. The exemplary embodiments apply for the other airbag chamber 12.

The inner strap 60 is connected to the airbag chamber 11 on the inner side 11b that faces the gap 3, for example via a seam 61. The seam 61 defines a fastening point A for the inner strap 60. The inner strap 60 runs from the fastening point A in the interior for the airbag chamber 11 in the direction of the outer side 11a, which faces away from the other airbag chamber 12, and is deflected by means of a deflection loop 62, for example a fabric loop 62. The deflection loop 62 is fastened in the interior of the airbag chamber 11 such that the deflection takes place in the interior of the airbag chamber 11.

The deflected end of the inner strap 60 is sewn in a connecting region 63 to the end of the fabric tube 64. The fabric tube 64 defines a type of tunnel for the outer strap 50 and is not in communication with the interior of the airbag chamber 11, i.e. gas cannot flow either out of the airbag chamber 11 into the fabric tube 64 nor out of the fabric tube 64 into the airbag chamber 11. The fabric tube 64 is, for example, an inwardly inverted snout-like formation.

One end of the outer strap 50 is sewn in the sewn connecting region 63 between one end of the inner strap 60 and one end of the fabric tube 64 defining a fastening point B for the outer strap 50. The strap 50 extends from the fastening point B through the fabric tube 64 and emerges from the fabric tube 64 at the opening 65 thereof and from the left airbag chamber 11. According to FIG. 9, the strap 50 bridges the gap 3, enters via the inlet opening of the fabric tube 74 of the other airbag chamber 12 into the fabric tube 74, and is sewn in a corresponding manner at a fastening point C to one end of the inner strap 70 and to one end of the fabric tube 74 of the airbag chamber 12. The other end of the inner strap 70 is connected to the inner side 12b of the airbag chamber 12 at a fastening point D.

As long as the two airbag chambers 11, 12 are filled with only a small amount of gas, their inner sides 11b, 12b can be pressed radially outward to a great extent such that they are at a large maximum distance. Since the fastening points A, D are displaced radially outward in relation to the position illustrated in FIG. 9, the strap 50 has less tension making it possible for the outer surfaces 11a, 12a to be able to move outward somewhat upon an impact of an occupant or upon the occupant being struck by the airbag. Therefore a body part of a vehicle occupant in an OOP situation can penetrate into the forming gap 3 and the force exerted on the vehicle occupant by the deploying airbag may be reduced.

As the airbag deploys and fills, the two inner surfaces 11b, 12b and the fastening points A, D move radially inward and the outer strap 50 is tensioned. In the deployed state with the outer strap 50 tensioned the sum of the lengths of the inner straps 60, 70 and of the outer strap 50 defines the maximum distance between the outer surfaces 11a, 12a of the airbag chambers 11, 12. The distance between the inner surfaces 11b, 12b is reduced in relation to the starting position. Due to a maximum distance between the outer surfaces 11a, 12a (predetermined by the straps 50, 60, 70), deployment takes place with a reduced distance between the inner surfaces 11b, 12b.

Figure 10:
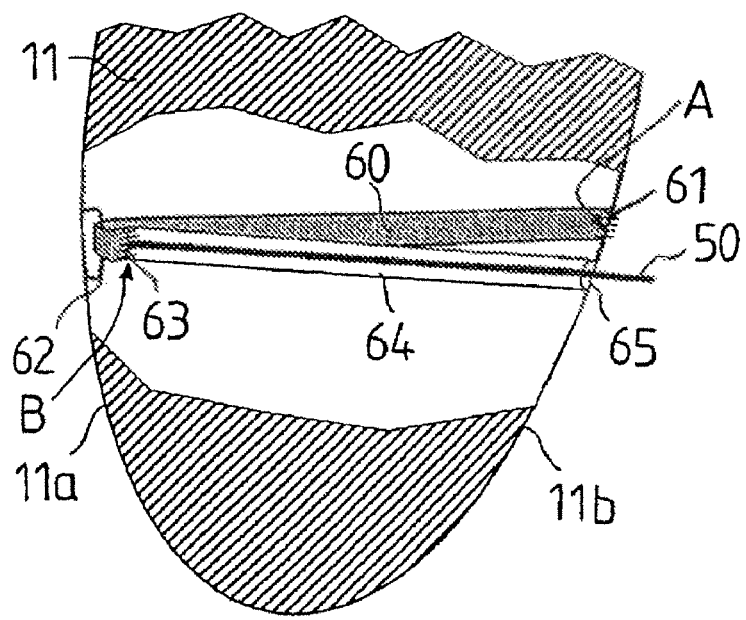
FIG. 10 is an enlarged illustration of the airbag section of FIG. 9 according to an exemplary embodiment.

In the case of the configuration of FIG. 6 and in the configuration of FIGS. 9 and 10 it is noted that if a body part of a vehicle occupant comes into contact with the airbag the respective straps are automatically tensioned since the two airbag chambers 11, 12 are pressed apart or expanded upon impact. The automatic tensioning may prevent the two airbag chambers 11, 12 from being pressed too far apart while the chamber 12 still exerts a restraining function even in the OOP situation and with little filling.

According to another exemplary embodiment, in a modification of the embodiment of FIGS. 9 and 10, the two inner straps 60, 70 and the outer strap 50 may be a single strap, i.e. are of an integrally formed design. The integral strap runs between the points A and D and is deflected at the deflection loops 62, 72. The integral strap runs completely through the two fabric tubes 64, 74. The fabric tubes 64, 74 are connected in the region of the fastening points B, C to the strap in a gas-tight manner and in particular are sewn in a gas-tight manner.

In the exemplary embodiments of FIGS. 5 to 10, the maximum distance of the inner sides 11b, 12b is dependent on the degree the airbag is filled. The distance decreases as the airbag is filled. Even at the maximum distance, the inner surfaces 11b, 12b are situated relatively close to each other, for example at the beginning of deployment. Upon interaction with an occupant in an OOP situation or a baby seat, the inner sides may move apart from each other and the airbag sections may expand. The moving away of the inner sides from each other may be ended when the inner sides reach the maximum distance. The maximum distance changes as a function of the degree the airbag is filled.

Germany Priority Application 202005013604.2, filed Aug. 25, 2005 including the specification, drawings, claims and abstract, is incorporated herein by reference in its entirety. Germany Priority Application 102006011058.7, filed Mar. 8, 2006 including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. An airbag module comprising:
an airbag including two sections that can be inflated to restrain a vehicle occupant, wherein the inflated airbag defines a gap that runs through the two airbag sections separating the two sections from each other on a front side of the airbag facing the vehicle occupant, and wherein a maximum distance between inner sides of the airbag sections that are adjacent to the gap is dependent on a degree the airbag is filled, the distance decreasing as the airbag is filled, and
a strap at least partially fastened to an outer skin of the airbag comprising at least a first and a second section of variable length, wherein the length of the first section increases or decreases to the extent the length of the second section decreases or increases, and wherein the length of the second section defines the maximum distance between the inner sides of the airbag sections.

2. The airbag module as claimed in claim 1, wherein the length of the first section increases with increased filling of the airbag and the length of the second section decreases with increased filling of the airbag.

3. The airbag module as claimed in claim 1, wherein the strap is connected to at least a first point of the first airbag section, to at least a second point to the second airbag section, and to at least a third point of the airbag or another element of the airbag module.

4. The airbag module as claimed in claim 3, wherein the strap is fixed at one end to a first fastening point of the airbag or of another element of the airbag module, the strap is fixed at a distal end to a second fastening point of the first airbag section and deflects at a deflection point defined on the second airbag section between the fastening points, the first section being defined between the first fastening point and the deflection point and the second section being defined between the deflection point and the second fastening point.

5. The airbag module as claimed in claim 4, wherein the deflection point is defined on the airbag by a loop or eyelet through which the strap extends.

6. The airbag module as claimed in claim 4, wherein the first fastening point position is essentially unchanged after the airbag is inflated.

7. The airbag module as claimed in claim 4, wherein the first fastening point position does not come into contact with the inflating airbag.

8. The airbag module as claimed in claim 4, wherein the deflection point and the second fastening point are each defined in a front region of the airbag sections, the front region facing the vehicle occupant.

9. The airbag module as claimed in claim 3, wherein the strap defines a closed loop and is connected to the airbag or to other elements of the airbag module either via two deflection points and a fastening point or via three deflection points.

10. The airbag module as claimed in claim 1, wherein the two airbag sections are defined by two airbag chambers that converge on rear sides that face away from the vehicle occupant.

11. The airbag module as claimed in claim 1, wherein the strap comprises a fabric strip.

12. An airbag module, comprising:
an airbag including two sections that can be inflated to restrain a vehicle occupant, wherein the inflated airbag defines a gap that runs through the two airbag sections separating the two airbag sections from each other on a front side of the airbag facing the vehicle occupant, wherein a maximum distance between inner sides of the airbag sections that are adjacent to the gap is dependent on a degree the airbag is filled, the distance decreasing as the airbag is filled, and
at least one strap that connects the two airbag sections to each other, wherein each airbag section comprising an inner strap that interacts with an outer strap that connects the two airbag sections,
wherein the outer strap extends within each airbag section in a fabric tube that is not connected to an interior of the airbag chambers.

13. The airbag module as claimed in claim 12, wherein the inner and outer straps define the maximum distance between an outer side of one airbag section that faces away from the gap and an outer side of the other airbag section that faces away from the gap, wherein the inner sides of the airbag sections are adjacent to the gap and move towards one another as the airbag is filled.

14. The airbag module as claimed in claim 12, wherein the inner strap extends in an interior of the airbag from a fastening point on an inner side of one airbag section that faces the gap to an outer side of the airbag section that faces away from the gap, the inner strap deflects at an inner deflection device and is connected to one end of the outer strap.

15. The airbag module as claimed in claim 12, wherein one end of the inner strap, one end of the fabric tube, and one end of the outer strap are connected to one another in a sewn together connecting region in each airbag section.

16. The airbag module as claimed in claim 12, wherein the inner strap and the outer strap are defined integrally as a single strap.

17. The airbag module as claimed in claim 12, wherein the fabric tube of each airbag section is connected at an end located in an interior of the respective airbag section to the strap in a gas-tight manner.

18. An airbag module, comprising:
an airbag including two airbag sections that can be inflated to restrain a vehicle occupant, wherein the inflated airbag defines a gap that runs between the two airbag sections and separates the two airbag sections from each other on a front side of the airbag facing the vehicle occupant, wherein a maximum distance between inner sides of the airbag sections that are adjacent to the gap is dependent on a degree the airbag is filled, the distance decreasing as the airbag is filled, and
two straps, wherein one end of one strap being fixed on an outer side of one airbag section facing away from the gap and the other end of the one strap being fixed on an inner side of the other airbag section facing the gap, wherein one end of the other strap is fixed on an outer side of the other airbag section facing away from the gap and the other end of the other strap being fixed on an inner side of the one airbag section facing the gap, and wherein the two straps run between fastening points on the outer side of the airbag sections and each strap runs along a front region of the airbag sections that faces a vehicle occupant.

19. An airbag module, comprising:
an airbag including two airbag sections that can be inflated to restrain a vehicle occupant, wherein the inflated airbag defines a gap that runs between the two airbag sections separating the two airbag sections from each other on a front side of the airbag facing the vehicle occupant, wherein a maximum distance between inner sides of the airbag sections that are adjacent to the gap is dependent on a degree the airbag is filled, the distance decreasing as the airbag fills, and
a movable part arranged in a region of the gap between the airbag sections, the movable part being displaced during a filling of the airbag and interacting with zip fasteners on the inner sides of the two airbag sections to connect the inner sides to each other.

20. The airbag module as claimed in claim 19, further comprising:
a strap,
wherein one end of the strap is fixed on an outer side one airbag section facing away from the gap and the other end of the strap is fixed on an outer side of the other airbag section facing away from the gap, and
wherein the strap runs along an outer side of the airbag, is connected to the movable part, and displaces the movable part in a direction of the front side of the airbag during a filling of the airbag.

* * * * *